(12) United States Patent
Chang et al.

(10) Patent No.: US 10,521,995 B2
(45) Date of Patent: Dec. 31, 2019

(54) CRANE OR HANGER-TYPE CARGO LANE DEVICE

(71) Applicants: Ti Chin Chang, Tainan (TW); Tong Tsan Chien, Tainan (TW); Chia Ling Hsieh, Tainan (TW); Yao Ling Chang, Tainan (TW)

(72) Inventors: Ti Chin Chang, Tainan (TW); Tong Tsan Chien, Tainan (TW); Chia Ling Hsieh, Tainan (TW); Yao Ling Chang, Tainan (TW)

(73) Assignee: Brighton-Best International (Taiwan) Inc., Tainan (TW)

( * ) Notice: Subject to any disclaimer, the term of this patent is extended or adjusted under 35 U.S.C. 154(b) by 0 days.

(21) Appl. No.: 16/262,831

(22) Filed: Jan. 30, 2019

(65) Prior Publication Data

US 2019/0164379 A1    May 30, 2019

(30) Foreign Application Priority Data

Jun. 8, 2018  (TW) .............................. 107119895 A

(51) Int. Cl.
*G07F 11/58* (2006.01)
*B65G 23/06* (2006.01)
*B65G 17/20* (2006.01)
*B65G 21/22* (2006.01)
*B65G 47/61* (2006.01)

(52) U.S. Cl.
CPC .............. *G07F 11/58* (2013.01); *B65G 17/20* (2013.01); *B65G 21/22* (2013.01); *B65G 23/06* (2013.01); *B65G 47/61* (2013.01)

(58) Field of Classification Search
CPC ........ B65G 17/20; B65G 47/61; B65G 23/06; B65G 21/22; G07F 11/58; G07F 11/60
USPC ........... 198/486.1, 465.4, 485.1, 687; 221/85
See application file for complete search history.

(56) References Cited

U.S. PATENT DOCUMENTS

| | | | | |
|---|---|---|---|---|
| 2,739,693 A | * | 3/1956 | Ames ..................... | B65G 47/61 198/464.2 |
| 3,454,148 A | * | 7/1969 | Harrison ................ | B65G 47/61 198/465.4 |
| 3,576,455 A | * | 4/1971 | Ingenito ................. | G04C 3/165 310/163 |
| 3,757,993 A | * | 9/1973 | Bruckner ................ | G07F 11/58 221/80 |
| 3,780,909 A | * | 12/1973 | Callahan ................ | G07F 11/58 221/85 |
| 6,439,423 B1 | | 8/2002 | Suzuki | |

(Continued)

*Primary Examiner* — Mark A Deuble

(57) ABSTRACT

A crane or hanger-type cargo lane device includes two parallel half housings, a chain mounting assembly, a roller chain assembly, a link, and a drive mechanism. The half housing includes a main plate, bent extensions on top, and a slit. The chain mounting assembly is between the main plates and includes two parallel frames, limit members each in the frame and having a slot, and a shuttle member between slots and having a bottom pawl. The roller chain assembly is between one set of the frame and the limit member and the other set of the frame and the limit member. The roller chain assembly includes two sets of plate members each having a top tooth and a bottom hook; and rollers each driven through the plate members of two sets. The bifurcated link is secured to the shuttle member through the slits. The drive mechanism rotates the link.

9 Claims, 19 Drawing Sheets

(56) References Cited

U.S. PATENT DOCUMENTS

| | | | | |
|---|---|---|---|---|
| 6,539,280 B1* | 3/2003 | Valiulis | ............... | G06Q 10/087 221/217 |
| 2002/0125266 A1* | 9/2002 | Vidondo | ................ | G07F 11/42 221/76 |
| 2009/0212064 A1* | 8/2009 | Beilenhoff | ............ | A47F 5/0838 221/85 |

* cited by examiner

CRANE OR HANGER-TYPE CARGO LANE DEVICE

BACKGROUND OF THE INVENTION

1. Field of the Invention

The invention relates to product release mechanisms and more particularly to a crane or hanger-type cargo lane device for a vending machine incorporating a roller chain assembly having linked plate members.

2. Description of Related Art

U.S. Pat. No. 6,439,423 to Suzuki, entitled "vending machine having a commodity discharge apparatus excellent in theftproofness", disclosed that in a commodity discharge apparatus for a vending machine, an endless chain extends on a vertical plane to form an endless loop and is engaged with a first and a second sprocket which are spaced from each other in a horizontal direction. The endless chain is adapted to circulate through the first and the second sprockets and through a lower and an upper traveling path each extending between the first and the second sprockets. A hook is attached to the endless chain and is for hooking a commodity only when the part is placed at the lower traveling path. In addition, a fall preventing member is disposed to extend in parallel to the lower traveling path beside the hook for preventing a fall of the commodity from the hook.

Notwithstanding the prior art, the invention is neither taught nor rendered obvious thereby.

SUMMARY OF THE INVENTION

It is therefore one object of the invention to dispose a crane or hanger-type cargo lane device incorporating a roller chain and hooks each hooking an item, thereby simplifying components for dispensing the items.

In a first aspect of the invention, there is provided a crane or hanger-type cargo lane device, comprising two half housings, a chain mounting assembly, a roller chain assembly, a link, and a drive mechanism wherein the half housings are parallel to each other and the half housing includes a main plate, bent extensions on a top of the main plate, and a slit through the main plate and under the extension; the chain mounting assembly is disposed between the main plates and includes two parallel frames, two elongated limit members each disposed in the frame and having an elongated slot, and a shuttle member fastened between slots of the limit members and having a pawl member on a bottom; the roller chain assembly is disposed between one set of the frame and the limit member and the other set of the frame and the limit member, the roller chain assembly includes two sets of a plurality of plate members, each plate member having a tooth on a top for receipt of the pawl member, and a hook extending downward from a bottom; and a plurality of rollers each driven through the plate member of one set and the plate member of the other set; the link is bifurcated and has one ends secured to sides of the shuttle member through the slits; and the drive mechanism is configured to rotate the other end of the link.

In a second aspect of the invention, there is provided a crane or hanger-type cargo lane device, comprising two half housings, a sprocket assembly, a spacer assembly, a roller assembly, a roller chain assembly, and a drive mechanism wherein the half housings are parallel to each other and the half housing includes a main plate, bent extensions on a top of the main plate, a front slit through the main plate, and a grooved member on a bottom; the sprocket assembly is disposed at rear portions of the half housings and includes spaced sprockets and an axle driven through the sprockets and the main plates; the spacer assembly is disposed between the main plates and includes a plurality of spaced, cylindrical members secured to the main plates, and a trough member disposed on the cylindrical members; the roller assembly includes a plurality of rollers rotatably mounted between the main plates and being forward of the spacer assembly, and positioning members on an outer surface of each main plate and secured to ends of the rollers respectively; the roller chain assembly is disposed between the main plate and meshes with the sprockets at a rear end thereof; the rollers rotatably contact a forward end of the roller chain assembly; the sprockets, the spacer assembly, and the rollers are disposed in the roller chain assembly; a lower portion of the roller chain assembly rotatably contacts the grooved members; the roller chain assembly includes two sets of a plurality of plate members each having spaced roller members rotatably secured to the corresponding plate member of the other set, and a hook extending downward from a bottom under one of the roller members; and the roller members rotatably contact the grooved members; and the drive mechanism is configured to impart a rotational force to the axle via a conveyor belt.

The invention has the following advantages and benefits in comparison with the conventional art: a plurality of plate members are linked to have an appearance and function similar to a roller chain. Each plate member has a hook for hooking an item to be sold.

The above and other objects, features and advantages of the invention will become apparent from the following detailed description taken with the accompanying drawings.

DETAILED DESCRIPTION OF THE INVENTION

Figure 1:
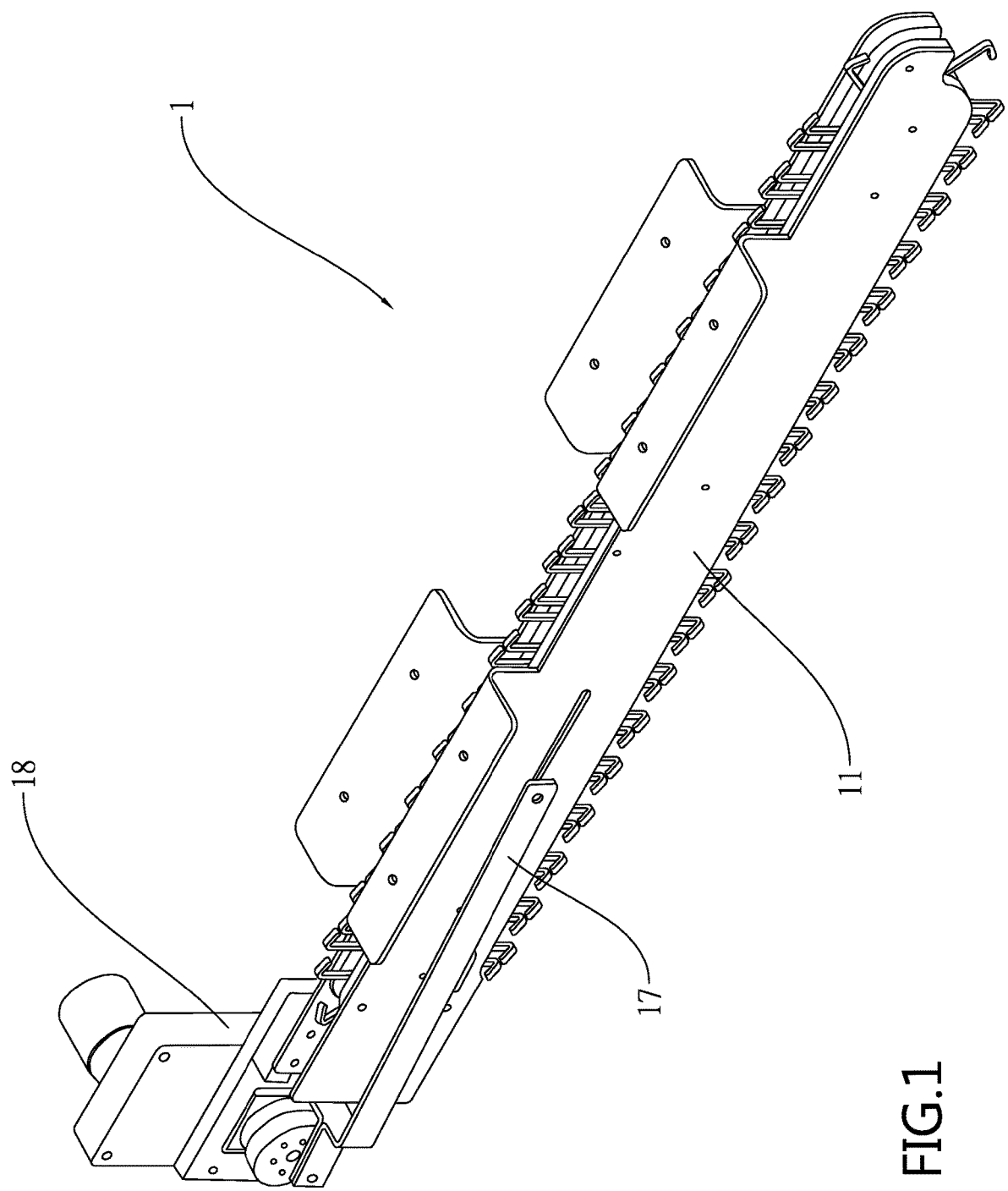
FIG. 1 is a perspective view of a crane or hanger-type cargo lane device according to a first preferred embodiment of the invention.
Figure 2:
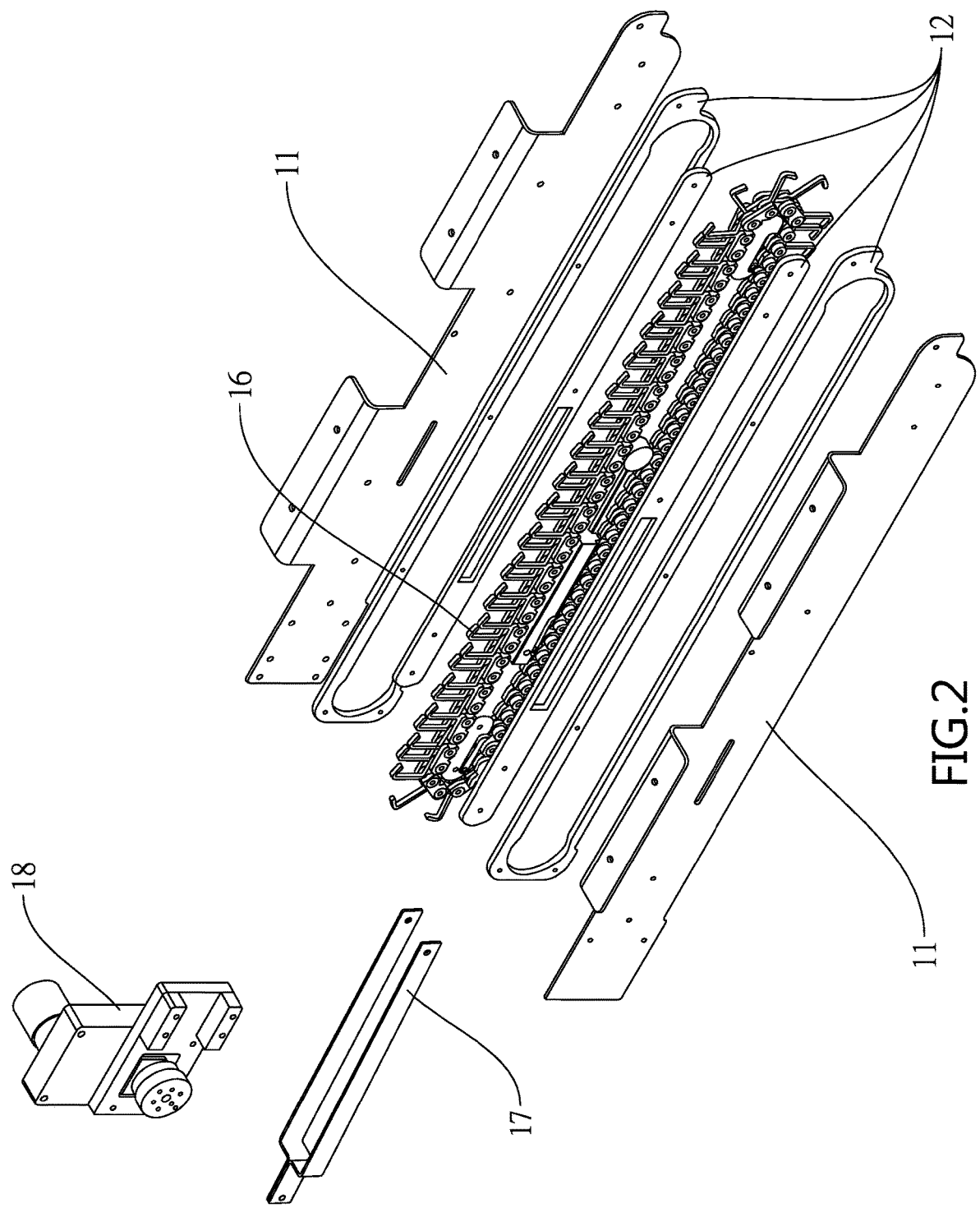
FIG. 2 is an exploded view of FIG. 1.
Figure 3:
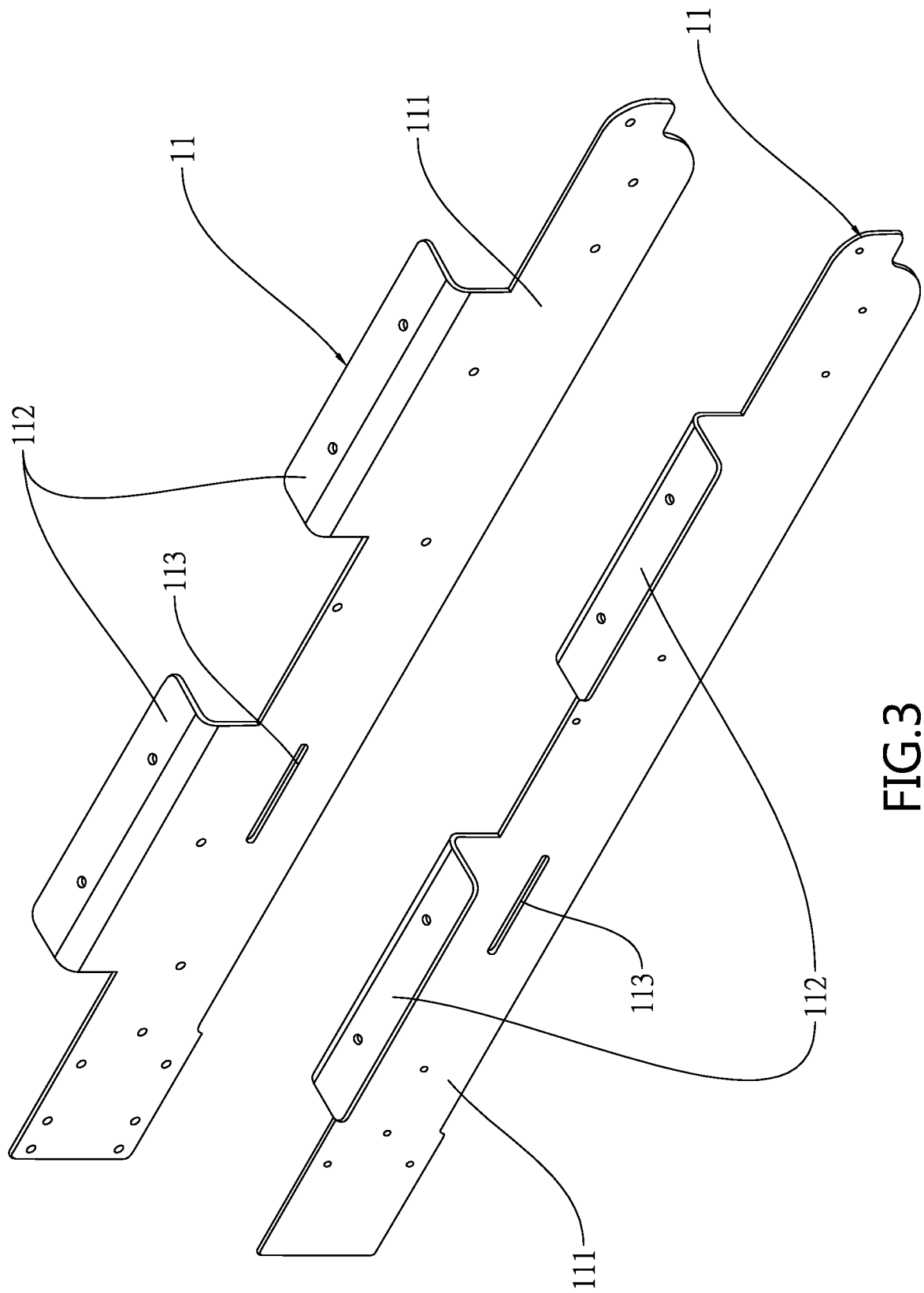
FIG. 3 is a perspective view of the half housings.
Figure 4:
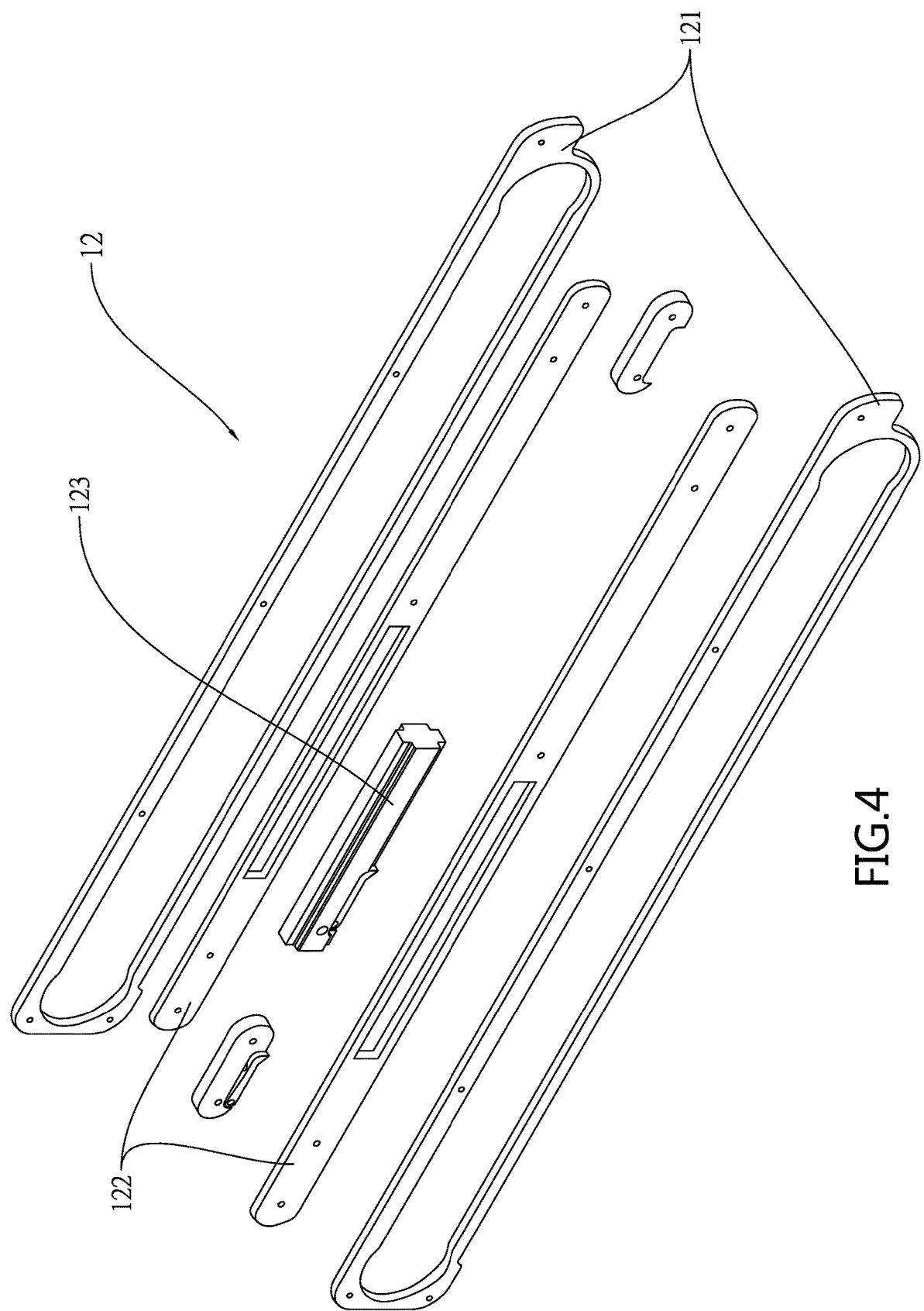
FIG. 4 is an exploded view of the chain mounting assembly.
Figure 5:
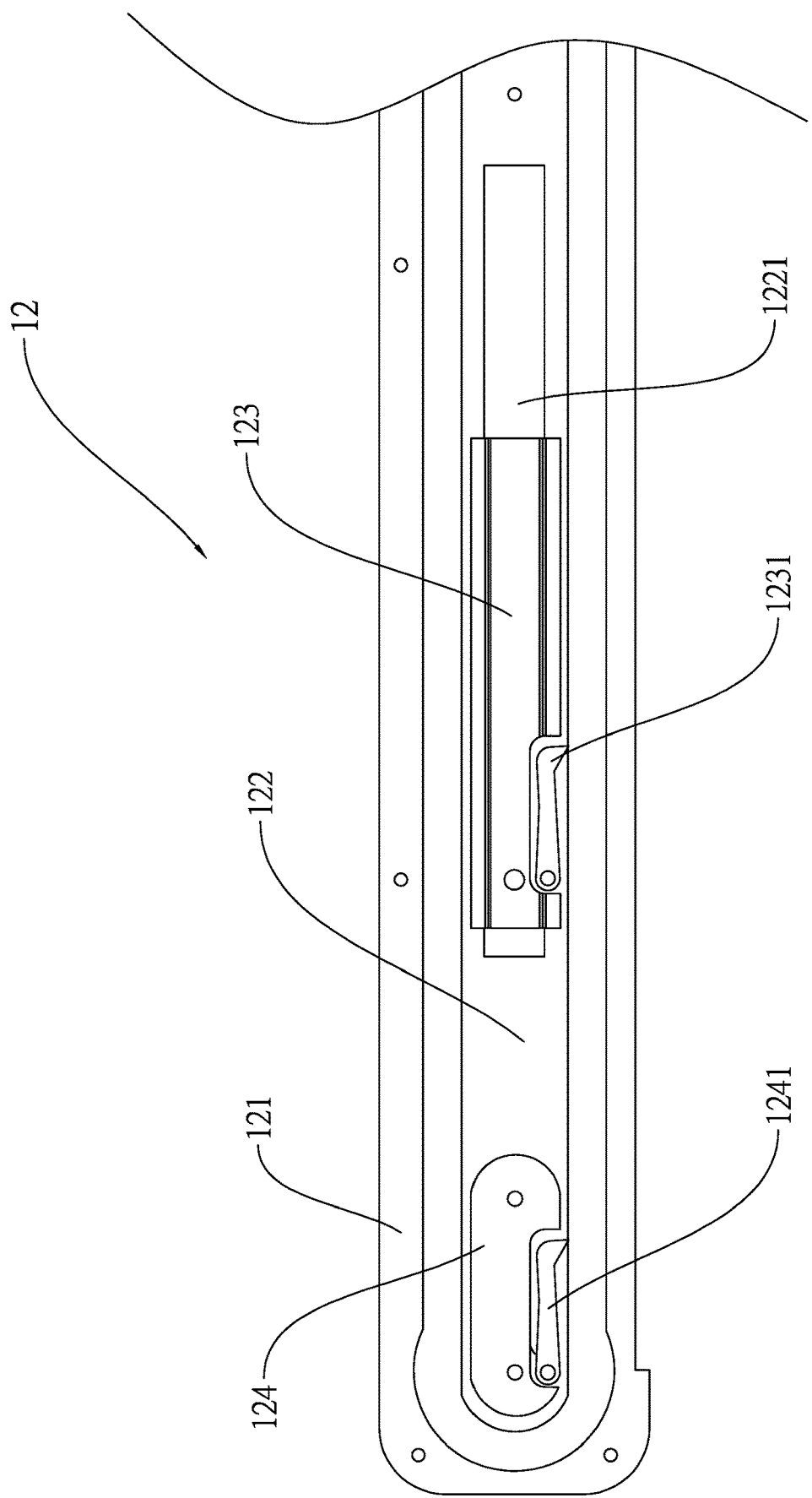
FIG. 5 is a side elevation of the chain mounting assembly.

Referring to FIGS. 1 to 8, a crane or hanger-type cargo lane device 1 in accordance with a first preferred embodiment of the invention comprises two half housings 11, a chain mounting assembly 12, a roller chain assembly 16, a link 17, and a drive mechanism 18 as discussed in detail below.

The half housings 11 are parallel to each other and the half housing 11 includes a main plate 111, bent extensions 112 on a top of the main plate 111, and a slit 113 through the main plate 111 and under the extension 112.

The chain mounting assembly 12 is disposed between the main plates 111 and includes two parallel frames 121, two elongated limit members 122 each disposed in the frame 121 and having an elongated slot 1221, a shuttle member 123 fastened between slots 1221 of the limit members 122 and having a pawl member 1231 on a bottom, and two mounting members 124 with the shuttle member 123 disposed therebetween, one of the mounting members 124 having a pawl element 1241 on a bottom.

The roller chain assembly 16 is disposed between one set of the frame 121 and the limit member 122 and the other set of the frame 121 and the limit member 122. The roller chain assembly 16 includes two sets of a plurality of plate members 161 having a tooth 164 formed on a top and a hook 163 extending downward from a bottom. A plurality of roller members 162 each is driven through either (i) the portion of the plate members 161 forward of the tooth 164 of one set of the plate members 161 and the portion of the plate members 161 rearward of the tooth 164 of the other set of the plate members 161 or (ii) the portion of the plate members 161 rearward of the tooth 164 of one set of the plate members 161 and the portion of the plate members 161 forward of the tooth 164 of the other set of the plate members 161 to attach one set of the plate members 161 to the other set of the plate members 161. The hook 163 is used to hook an item (not shown). The pawl member 1231 and the pawl element 1241 each is disposed on a moderate slope on one edge of the tooth 164. Thus, the roller chain assembly 16 is allowed to move counterclockwise only as shown in FIG. 6.

The bifurcated link 17 has two branches secured to sides of the shuttle member 123 through the slits 113. The link 17 may reciprocate to move the shuttle member 123. And in turn, the pawl member 1231 moves to clear the tooth 164 and enter the tooth 164 again. As a result, the shuttle member 123 may move back and forth in the slot 1221 so that the roller chain assembly 16 may move back and forth in a space defined by the frame 121 and the limit members 122.

The drive mechanism 18, as the drive source, has an output rotatably attached to the root of the link 17. In short, an activation of the drive mechanism 18 may rotate the root of the link 17, thereby moving a member (e.g., the shuttle member 123) attached to the branches of the link 17 back and forth, i.e., converting a rotational movement into a linear movement.

Figure 6:
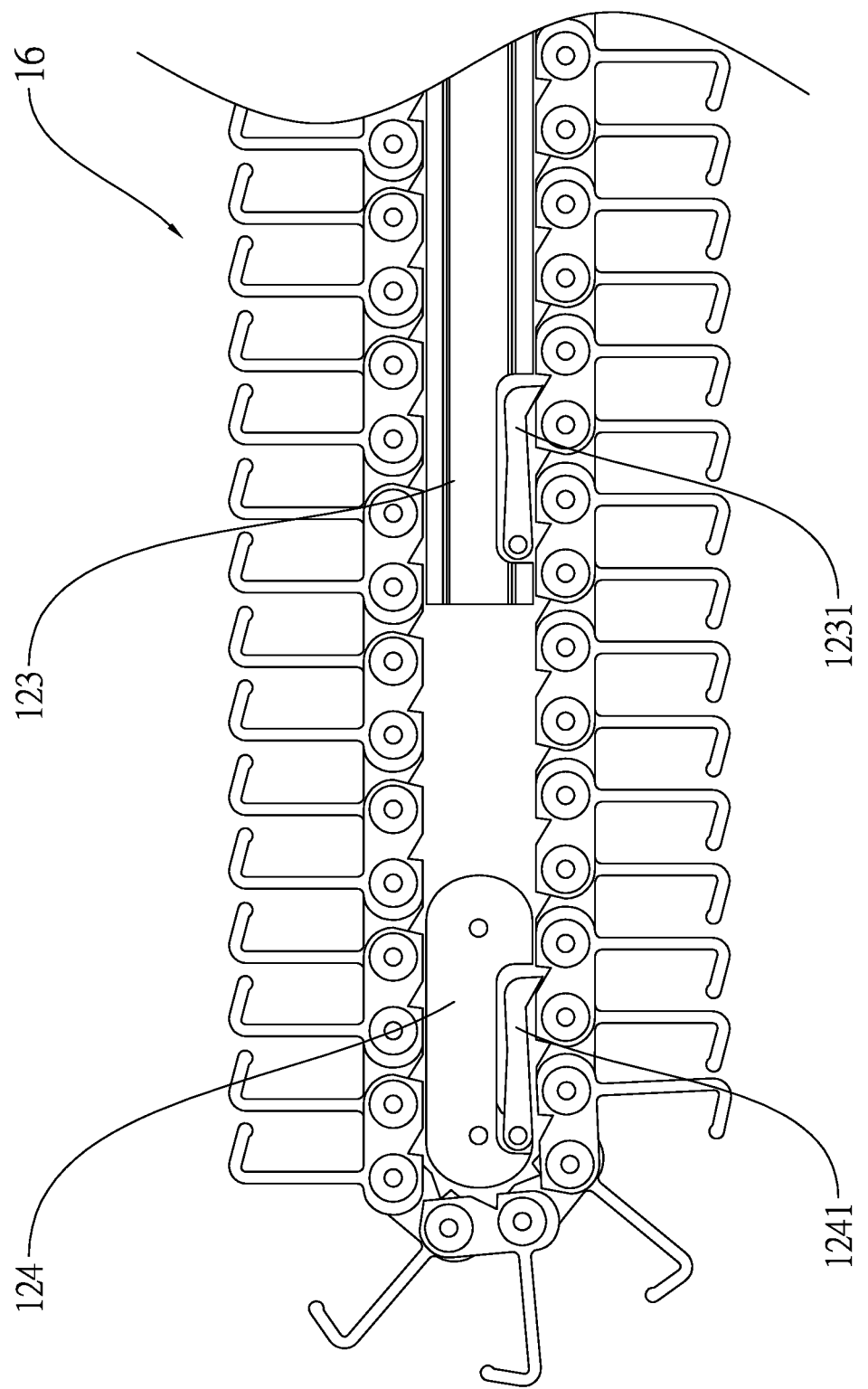
FIG. 6 is a side elevation of the roller chain assembly.
Figure 7:
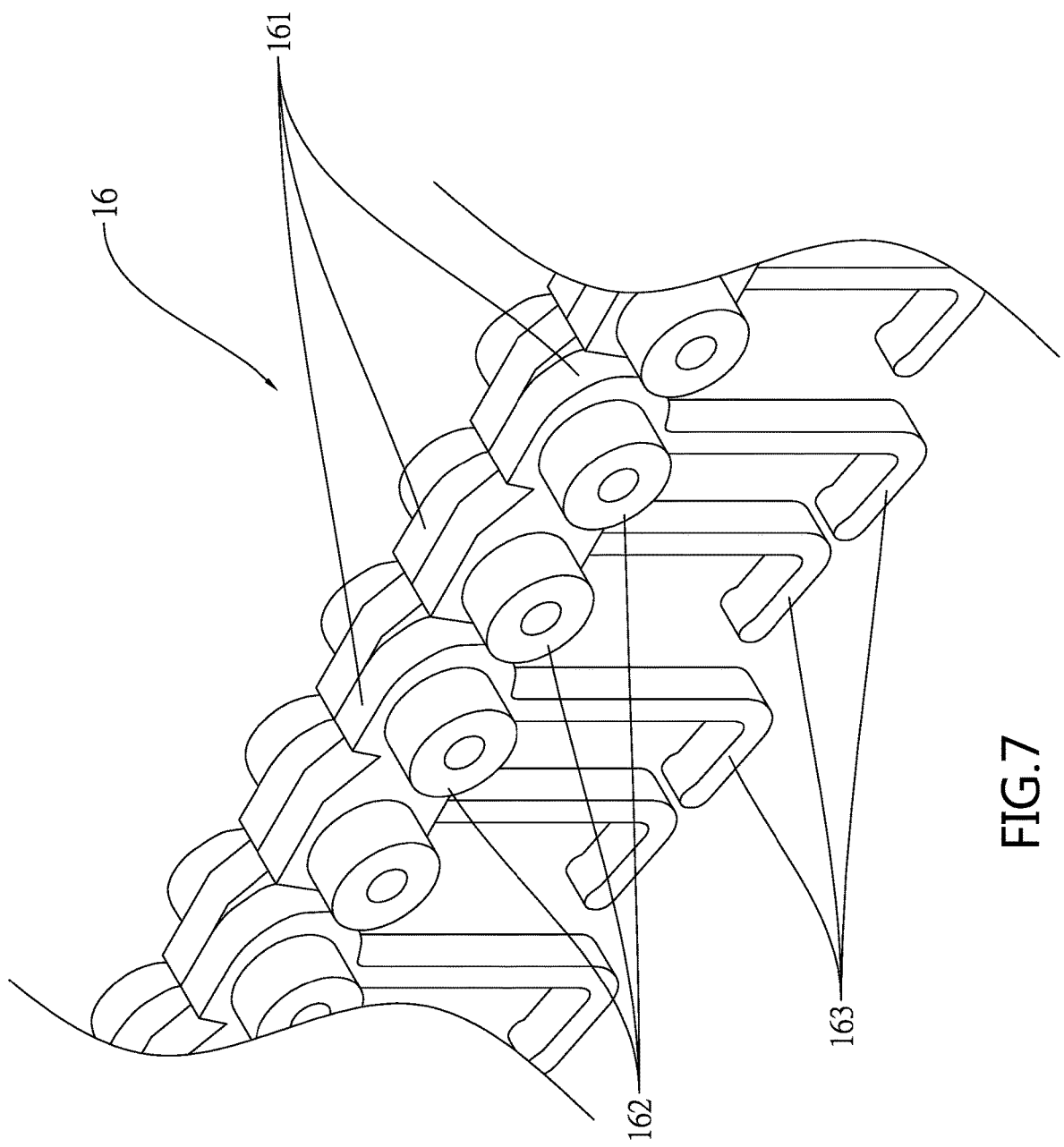
FIG. 7 is a detailed view of a portion of the roller chain assembly.
Figure 8:
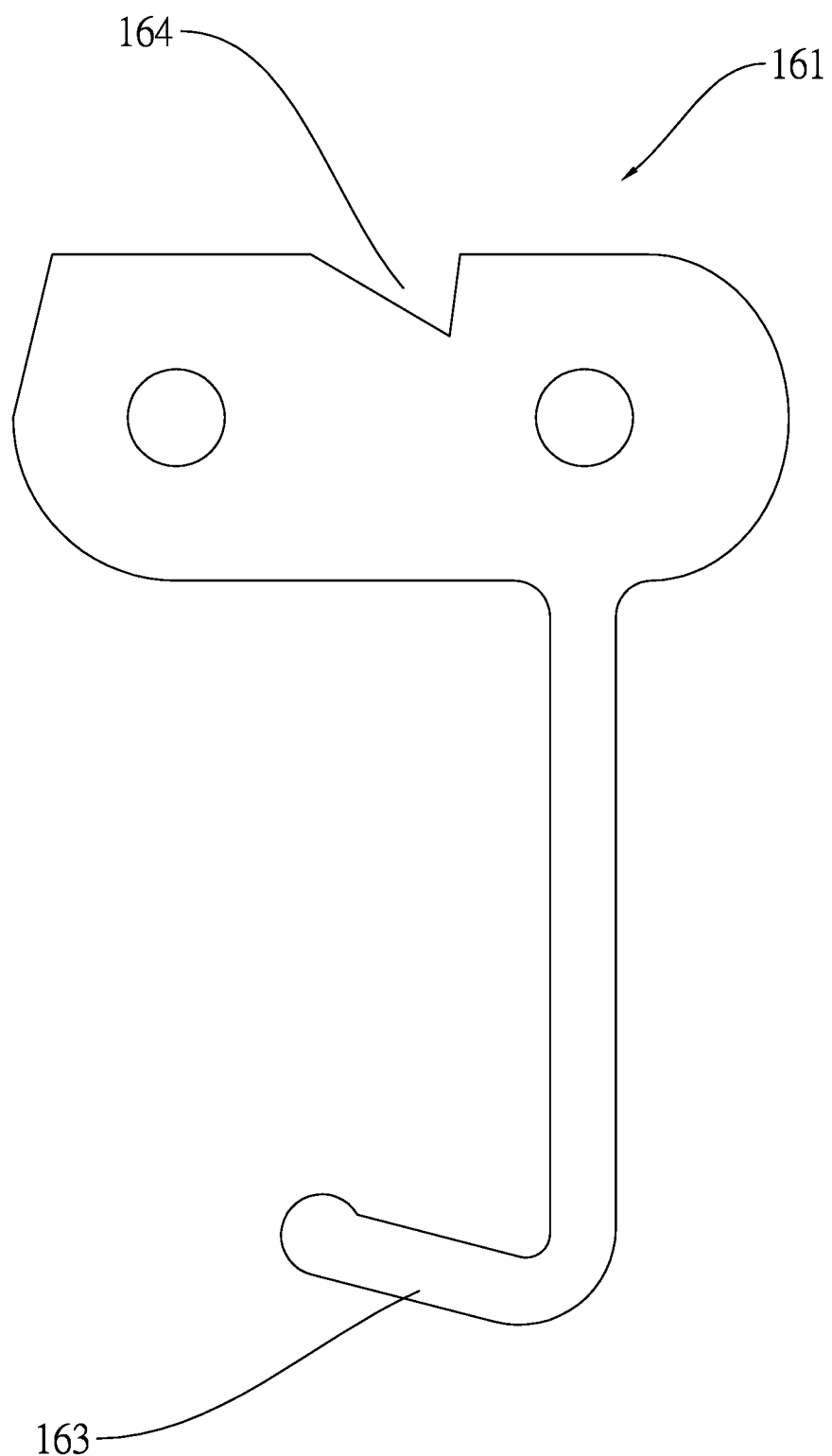
FIG. 8 is a side elevation of the plate member.
Figure 9:
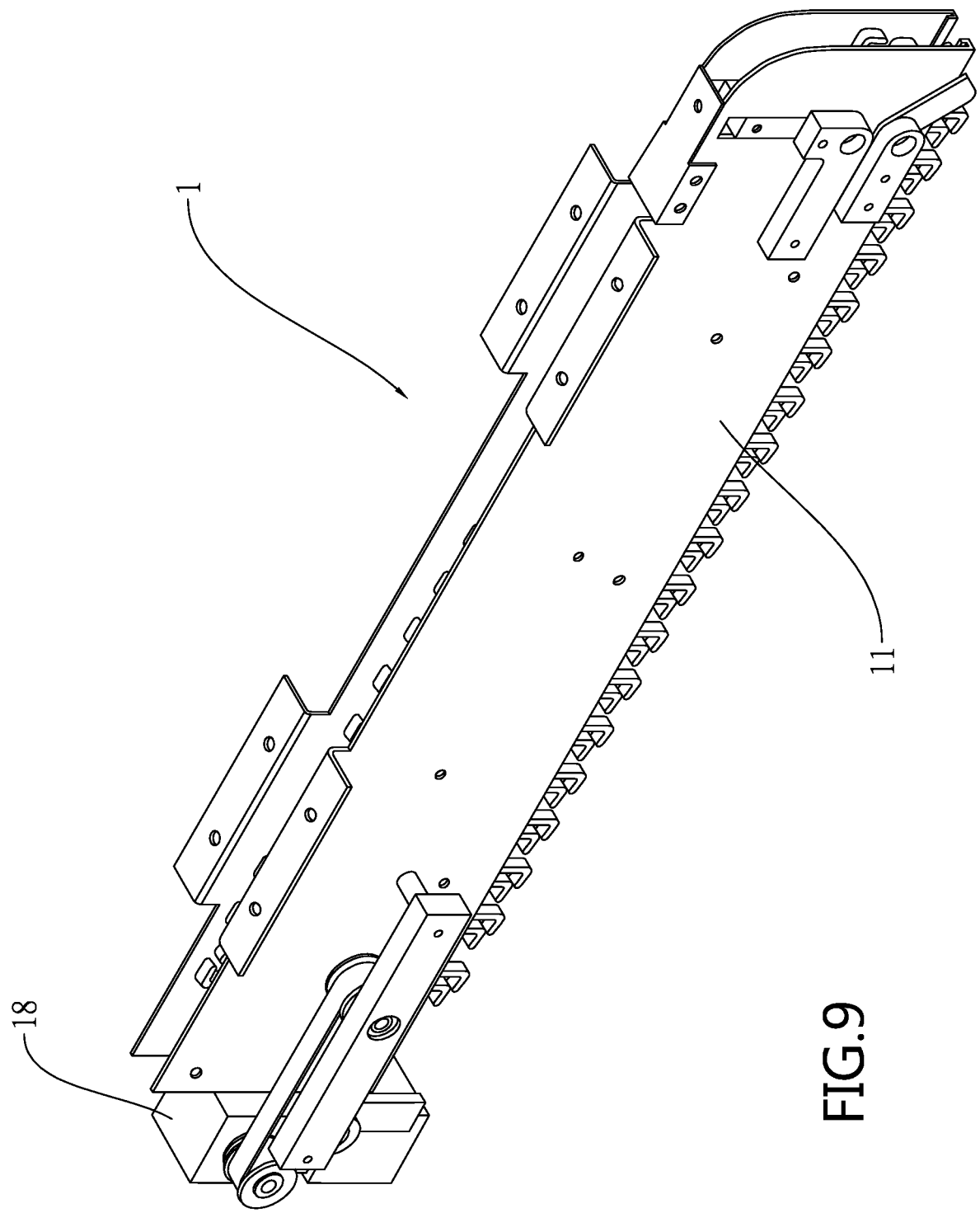
FIG. 9 is a perspective view of a crane or hanger-type cargo lane device according to a second preferred embodiment of the invention.
Figure 10:
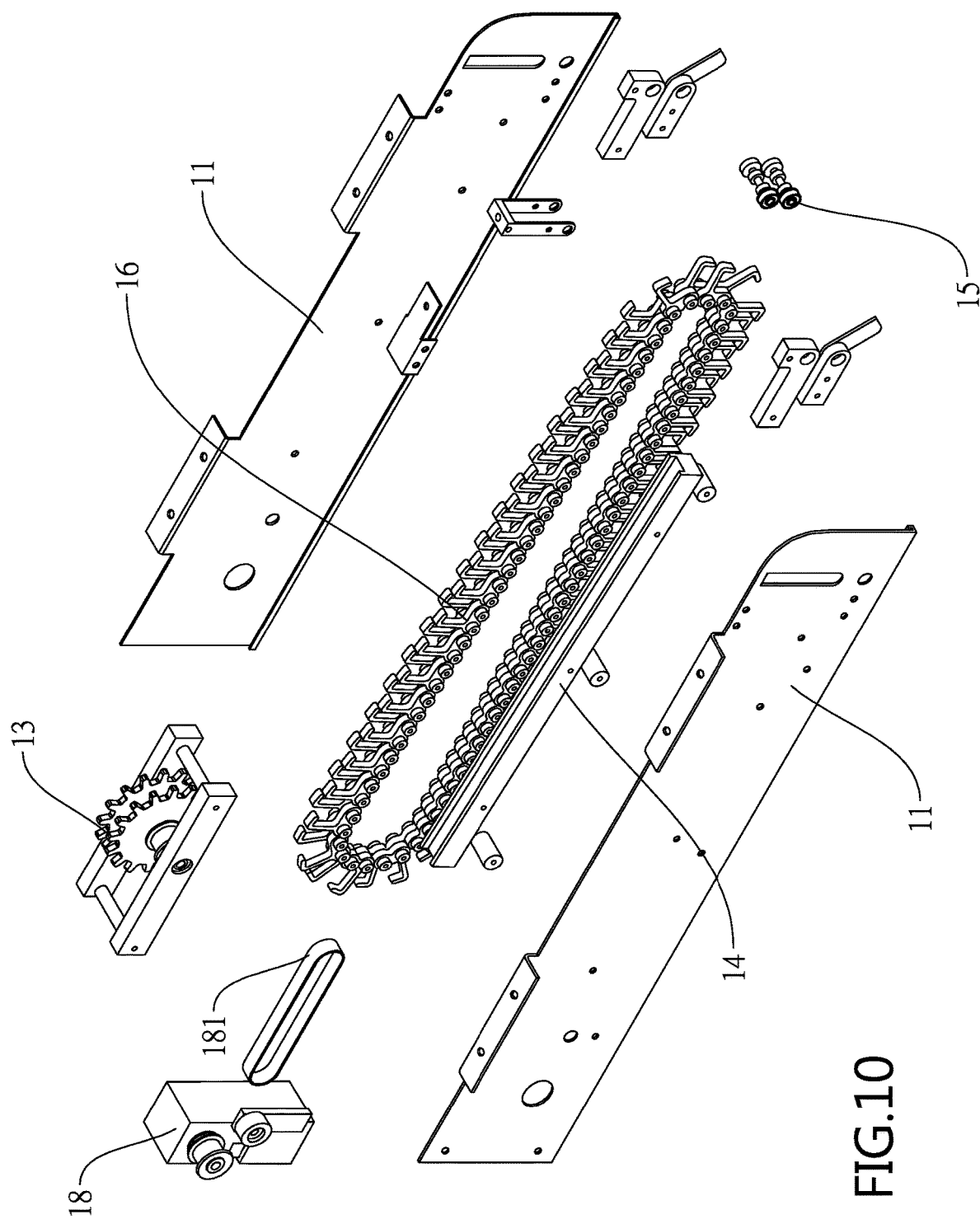
FIG. 10 is an exploded view of FIG. 9.
Figure 11:
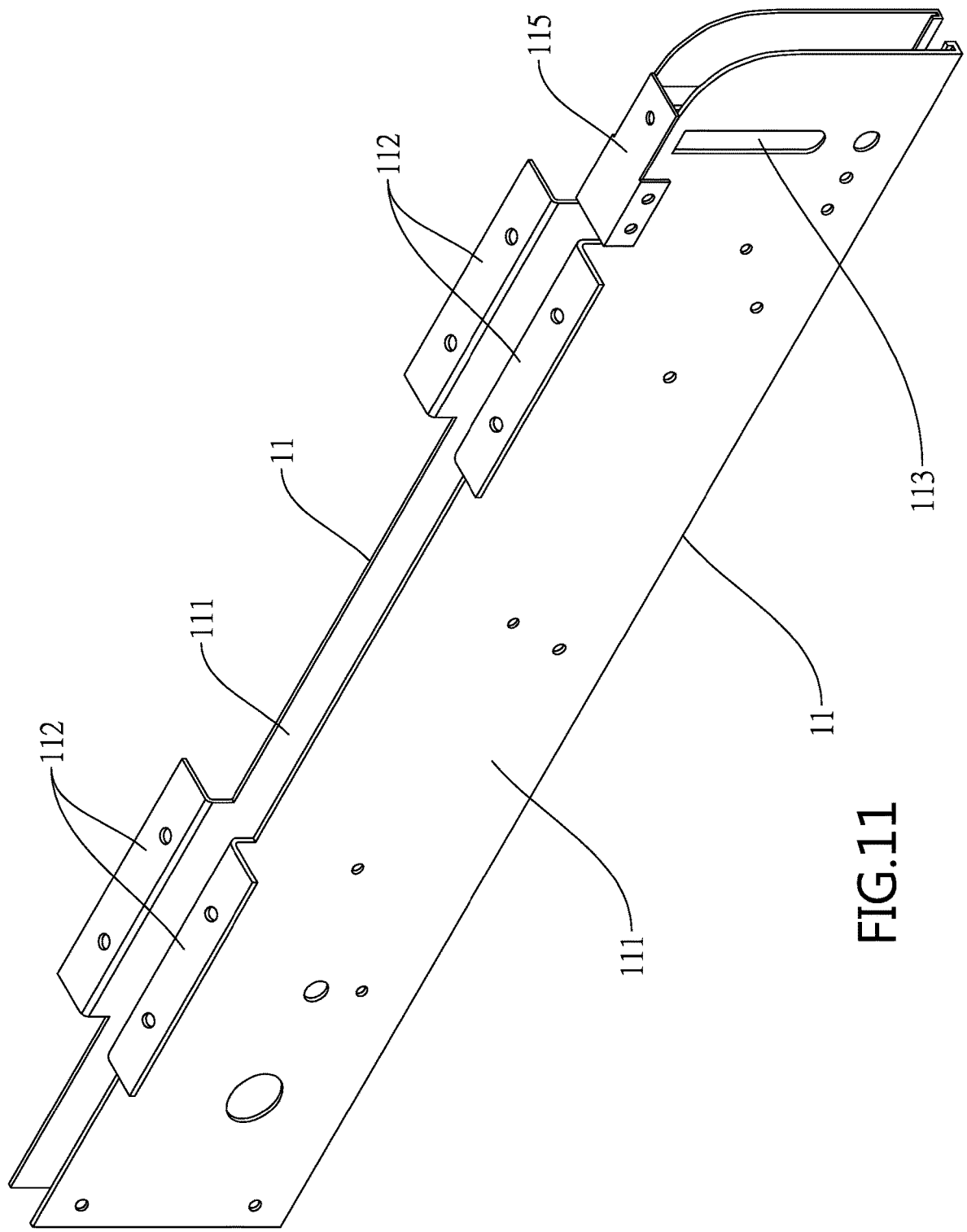
FIG. 11 is a perspective view of the half housings of FIG. 9.
Figure 12:
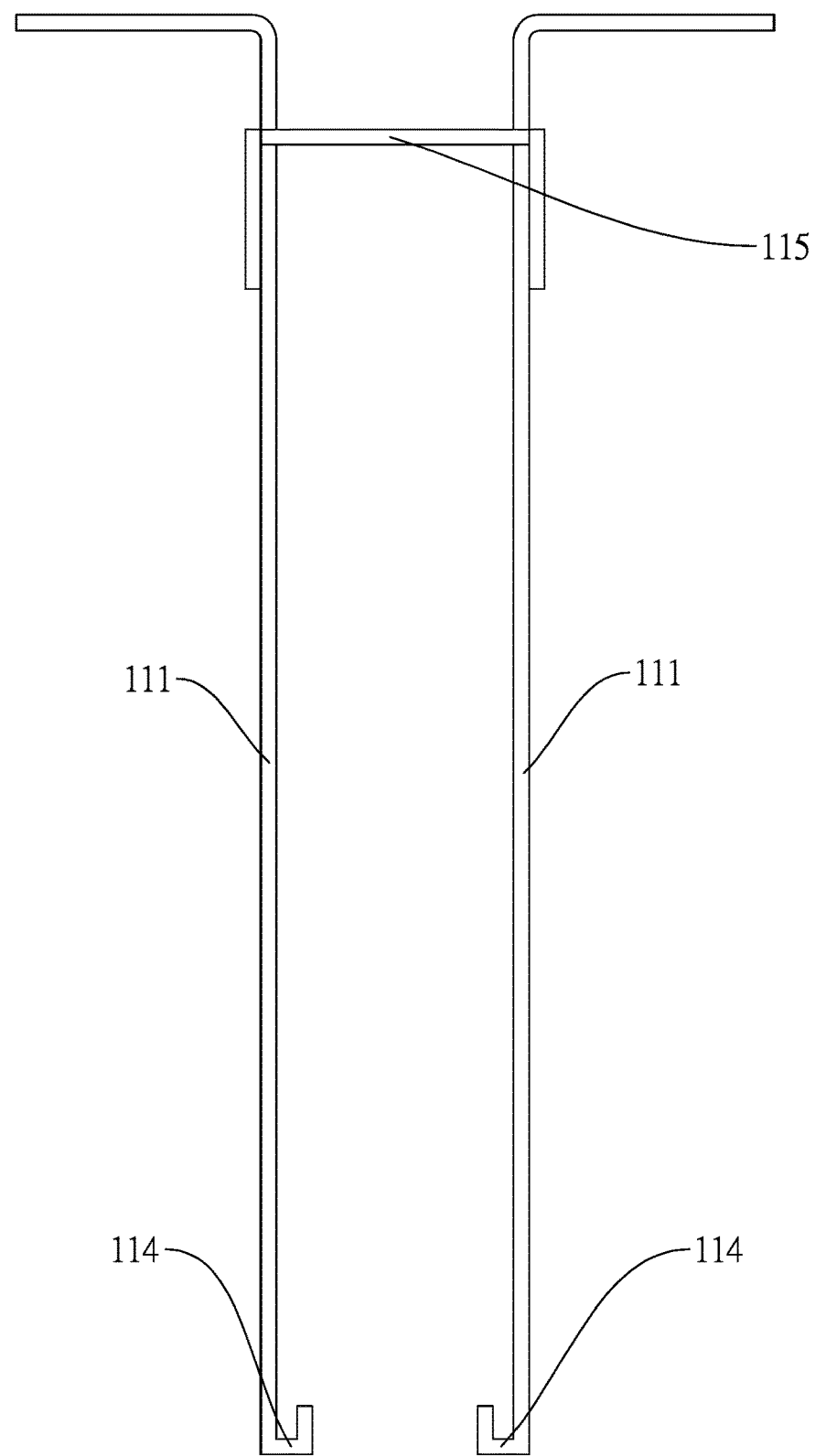
FIG. 12 is an end view of FIG. 11.
Figure 13:
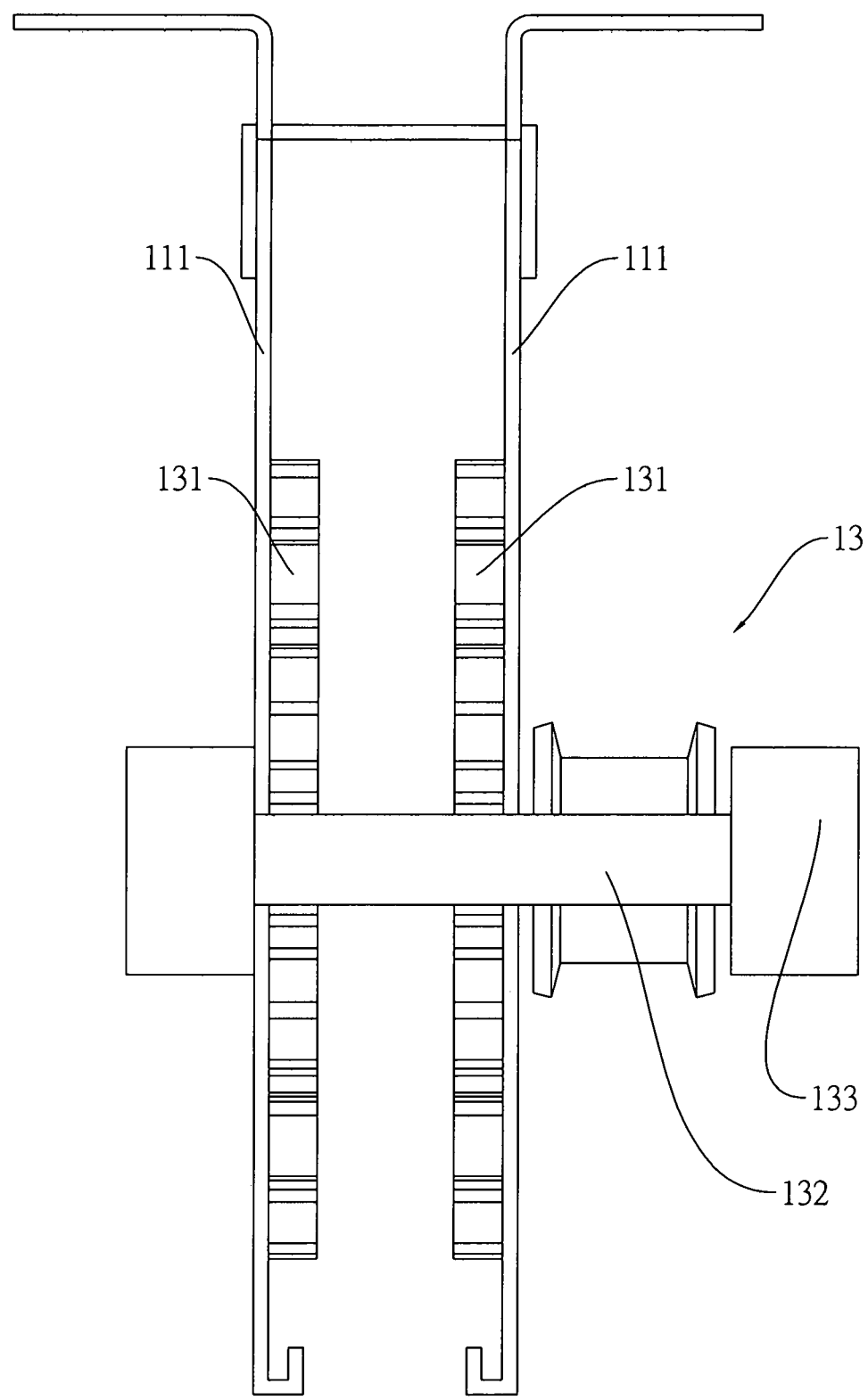
FIG. 13 is an end view of FIG. 11 with the sprocket assembly attached thereto.
Figure 14:
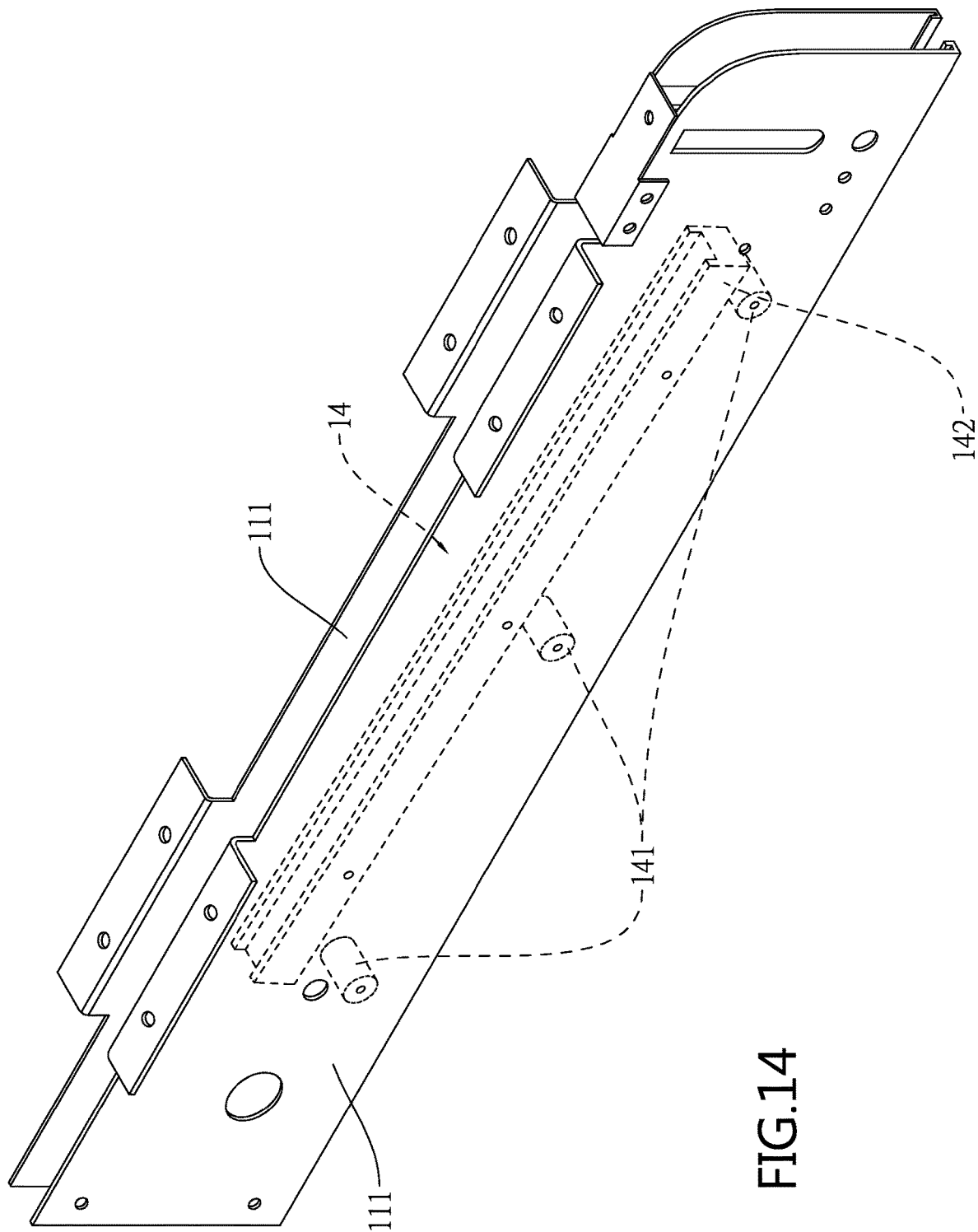
FIG. 14 is a view similar to FIG. 11 with the spacer assembly attached thereto.
Figure 15:
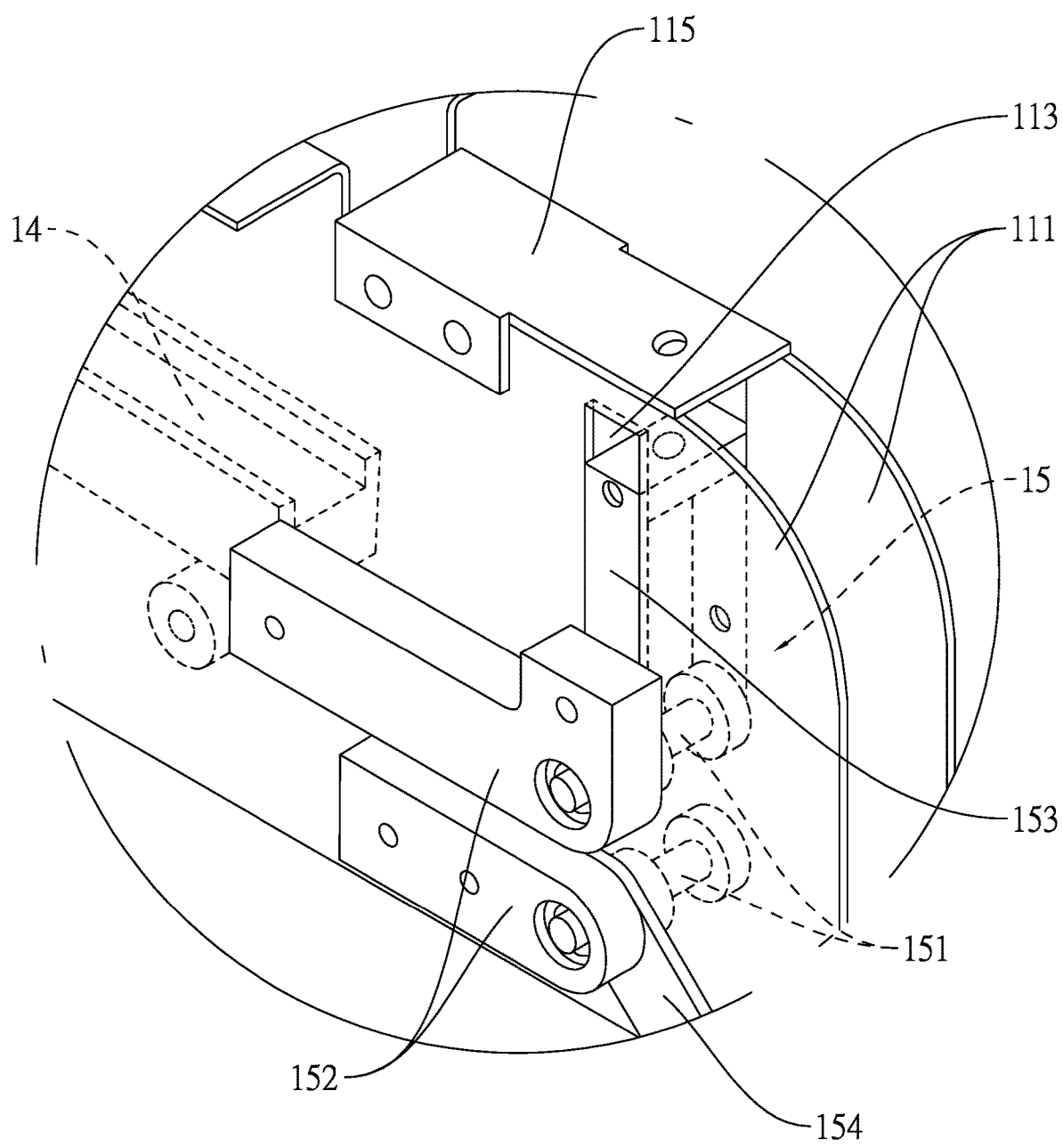
FIG. 15 is a detailed view of the right portion of FIG. 9.
Figure 16:
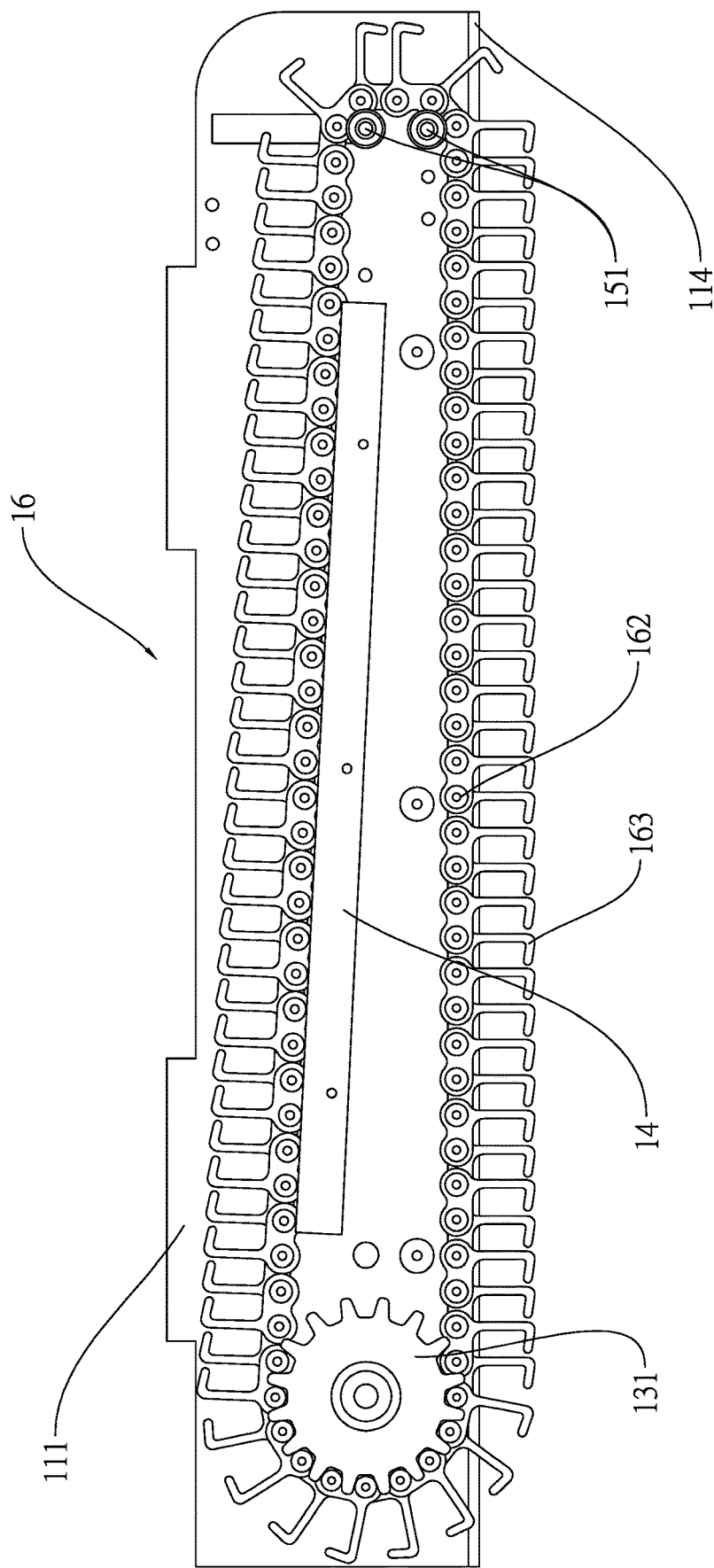
FIG. 16 is a side elevation of the roller chain assembly and associated components of FIG. 9.
Figure 17:
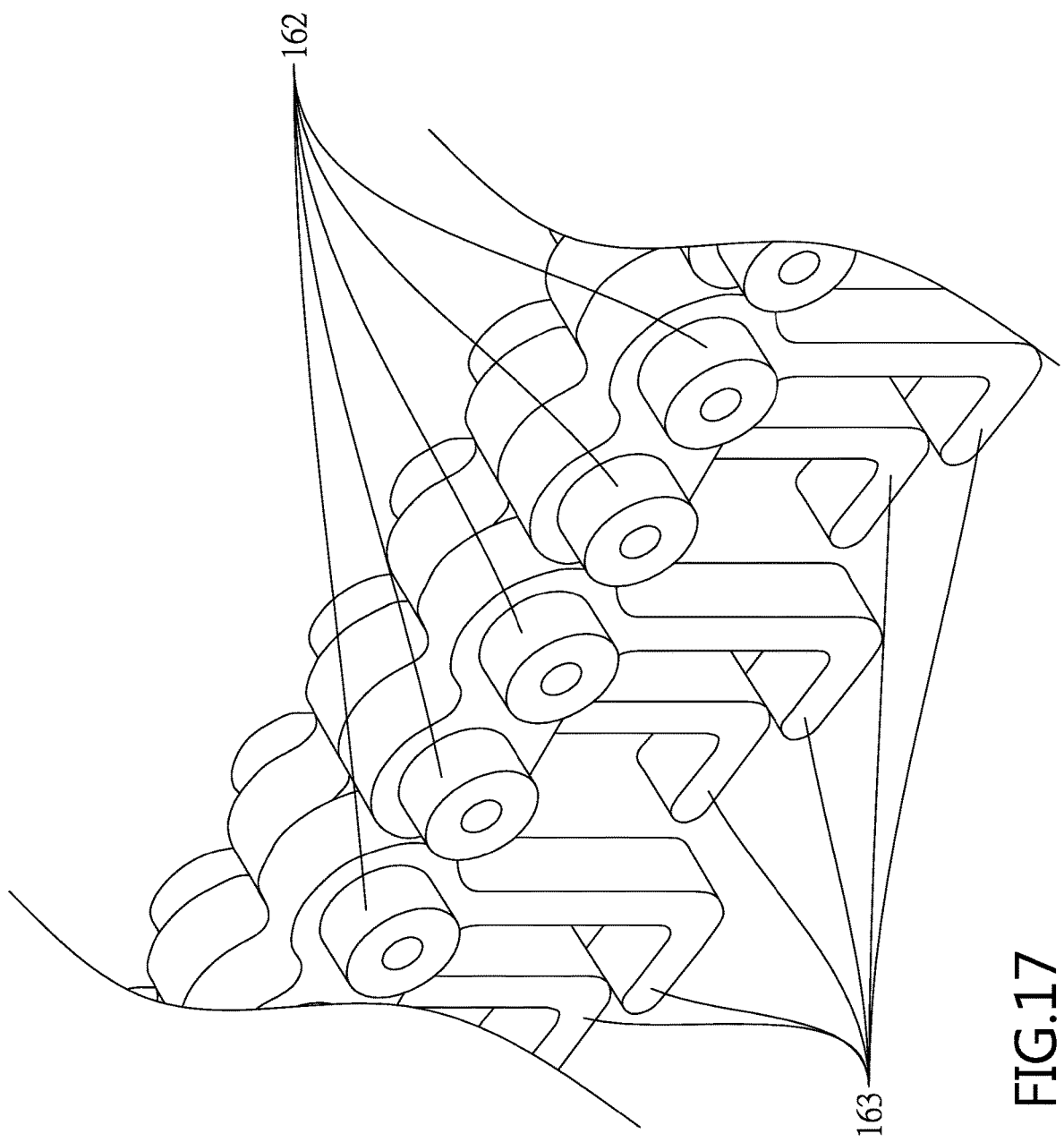
FIG. 17 is a perspective view showing a portion of the roller chain assembly of FIG. 16.
Figure 18:
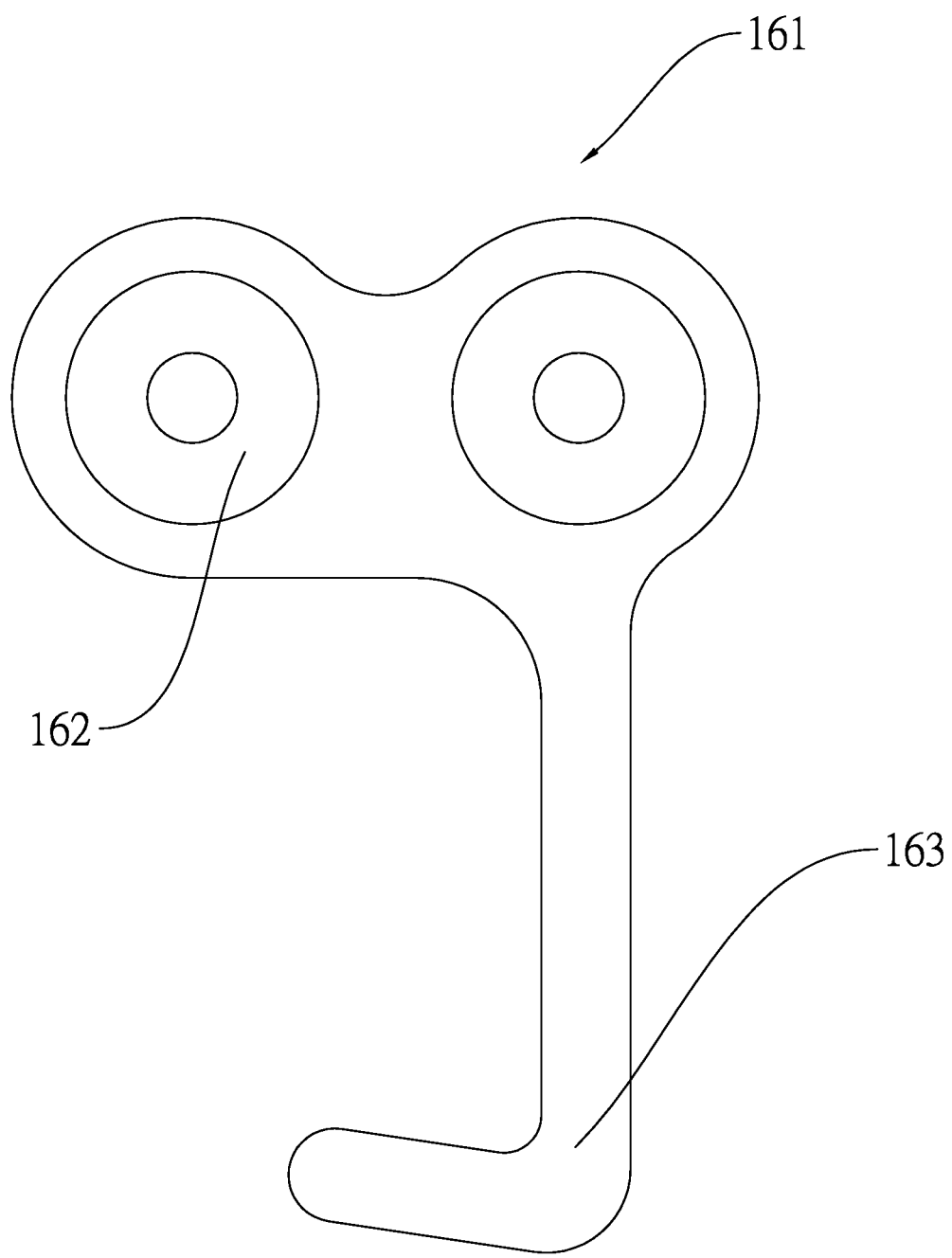
FIG. 18 is a side elevation of the plate member of FIG. 9.
Figure 19:
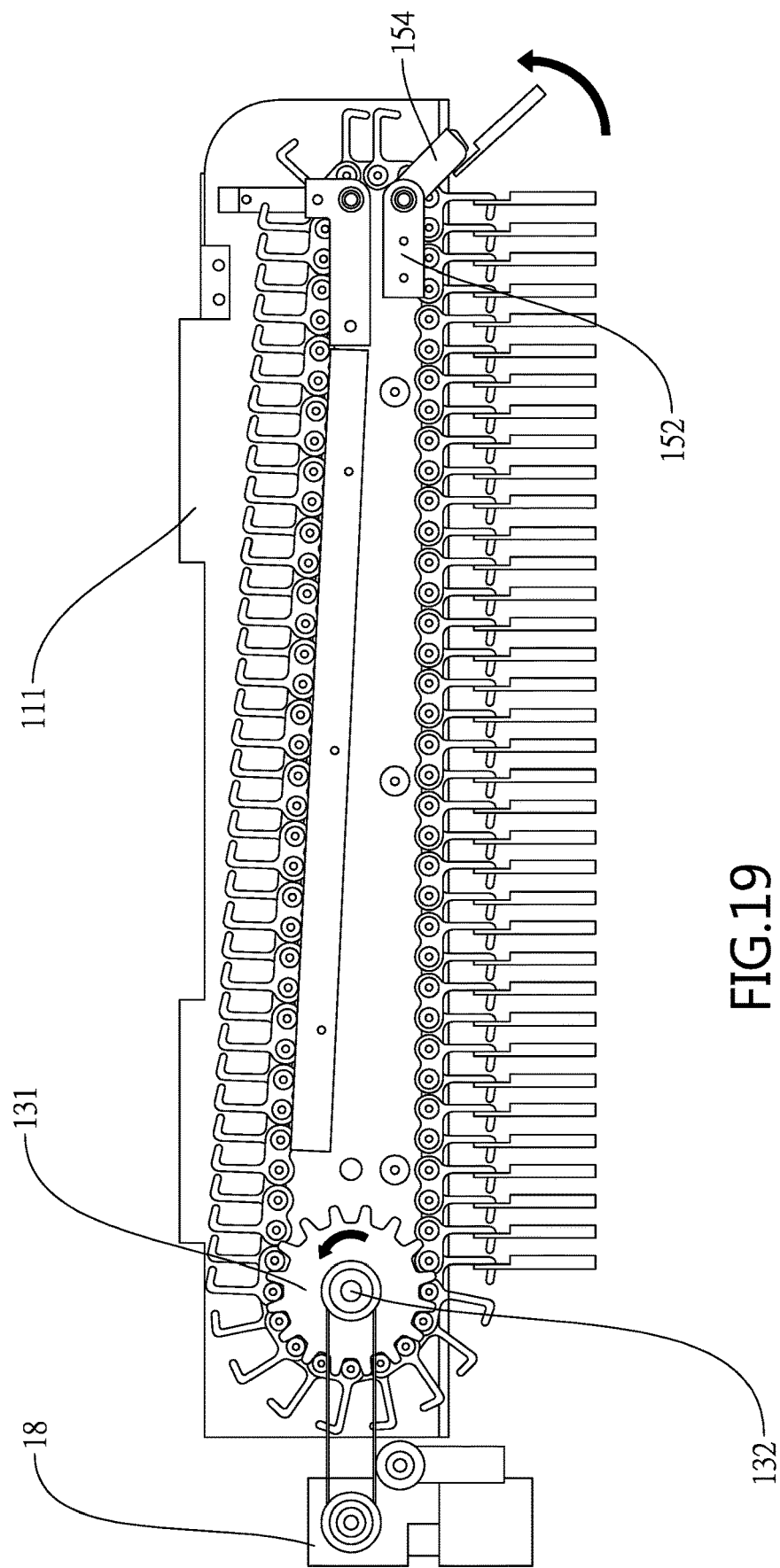
FIG. 19 is a view similar to FIG. 16 showing an operation thereof.

As shown in FIGS. 6, 7 and 8 specifically, a back and forth movement of the link 17 moves the shuttle member 123 back and forth and this movement is repeated. In detail, a rearward movement of the shuttle member 123 moves the pawl member 1231 rearward to enter the tooth 164 of a plate member 161. And in turn, the roller chain assembly 16 moves rearward.

The shuttle member 123 begins to move forward after being stopped at a rear end of the slot 1221. The forward movement of the shuttle member 123 moves both the pawl member 1231 and the roller chain assembly 16. The pawl member 1231 is in the tooth 164 and the pawl element 1241, disposed rearward of the shuttle member 123, enters the tooth 164 of a rear one of the plate members 161. Each of the pawl member 1231 and the pawl element 1241 catches against the steeply sloped edge of the tooth 164 it encounters, thereby locking it against the tooth 164 and preventing any further motion in the forward direction. And in turn, the plate member 161 rotates about the roller member 162 thereof to pivot the hook 163. As a result, the item hooked on the hook 163 is dropped to fall into an empty compartment of a vending machine. It is noted that, the roller chain assembly 16 is temporarily fastened, i.e., the roller chain assembly 16 being motionless in response to the forward movement of the shuttle member 123. As such, a repeated back and forth movement of the shuttle member 123 in the slot 1221 repeatedly moves the roller chain assembly 16 back and forth accordingly.

The items hooked on the hooks 163 are arranged based on sizes thereof. In detail, small items may be hooked on a one by one sequence and large items may be hooked on the hooks 163 in a large spacing for accommodating its large size. It is noted that it is not necessary to change the number of the plate members 161. It is a setting selection that system parameters of the device can be set to allow the hook 163 to release an item after at least one time of the linear movement of the link 17 driven by the drive mechanism 18.

Referring to FIGS. 9 to 19, a crane or hanger-type cargo lane device 1 in accordance with a second preferred embodiment of the invention comprises two half housings 11, a sprocket assembly 13, a spacer assembly 14, a roller assembly 15, a roller chain assembly 16, and a drive mechanism 18 as discussed in detail below.

The half housings 11 are parallel to each other and the half housing 11 includes a main plate 111, bent extensions 112 on a top of the main plate 111, a front slit 113 through the main plate 111, and a grooved member 114 on a bottom. A joining member 115 is used to secure top, front portions of the main plates 111 together.

The sprocket assembly 13 is disposed at rear portions of the half housings 11 and includes spaced sprockets 131, an axle 132 driven through the sprockets 131 and the main plates 111, and fasteners 133 for fastening the axle 132, the sprockets 131, and the main plates 111 together.

The spacer assembly 14 is disposed between the main plates 111 and includes a plurality of spaced, cylindrical members 141 secured to the main plates 111, and a trough member 142 disposed on the cylindrical members 141.

The roller assembly 15 includes a plurality of rollers 151 rotatably mounted between the main plates 111 and being forward of the spacer assembly 14, positioning members 152 on an outer surface of each main plate 111 and secured to ends of the rollers 151 respectively, a control member 153 disposed in the slits 113 and attached to the rollers 151 for adjusting locations of the rollers 151, and limit members 154 each disposed on the outer surface of the main plate 111 and extending forward, downward from the lower positioning member 152. The joining member 115 is used to fasten the control member 153 after the positions of the rollers 151 have been adjusted.

The roller chain assembly 16 is disposed between the main plate 111 and meshes with the sprockets 131 at its rear end. Further, the rollers 151 rotatably contact a forward end of the roller chain assembly 16. Furthermore, the sprockets 131, the spacer assembly 14 and the rollers 151 are disposed in the roller chain assembly 16. The lower portion of the roller chain assembly 16 rotatably contacts the grooved members 114. The roller chain assembly 16 includes two sets of a plurality of plate members 161 each having spaced roller members 162 rotatably secured to the corresponding plate member 161 of the other set, and a hook 163 extending downward from a bottom under one of the roller members 162. Further, the roller members 162 rotatably contact the grooved members 114.

The drive mechanism 18, as the drive source, has a rotational shaft with one end of a conveyor belt 181 put around it. The other end of the conveyor belt 181 is put around the axle 132. Thus, an activation of the drive mechanism 18 rotates the conveyor belt 181, thereby rotating the axle 132. And in turn, the sprockets 131 rotate to rotate the roller chain assembly 16.

Product release operation of the second preferred embodiment of the invention is detailed below. An activation of the drive mechanism 18 rotates the conveyor belt 181, thereby rotating the axle 132. And in turn, the sprockets 131 rotate with its tooth inserted into a gap between the roller members 162, thereby rotating the roller chain assembly 16 (see FIG. 16). When the rotating plate members 161 contacts the rollers 151 (see FIG. 15), the item is still hooked on the hook 163. One limit member 154 may block the item on the hook 163. The rotating roller chain assembly 16 may cause the limit member 154 to disengage the item from the hook 163. As a result, the item is release to drop into an empty compartment of a vending machine. It is certain that the item is released from the hook 163 when the plate member 161 having the hook 163 arrives at this position.

The items hooked on the hooks 163 are arranged based on sizes thereof. In detail, small items may be hooked on a one by one sequence and large items may be hooked on the hooks 163 in a large spacing for accommodating its large size. It is noted that it is not necessary to change the number of the plate members 161. It is a setting selection that system parameters of the device can be set to allow the hook 163 to release an item by setting minimum pivotal angles of the sprockets 131 per step.

The crane or hanger-type cargo lane device of the invention has the following characteristics and advantages: a plurality of plate members are linked to have an appearance and function similar to a roller chain. Each plate member has a hook for hooking an item to be sold. Simple adjustment of the hanging locations of the items and setting system parameters of the device can accommodate items of different sizes.

While the invention has been described in terms of preferred embodiments, those skilled in the art will recognize that the invention can be practiced with modifications within the spirit and scope of the appended claims.

What is claimed is:

1. A crane cargo lane device, comprising two half housings, a chain mounting assembly, a roller chain assembly, a link, and a drive mechanism wherein:
   the half housings are parallel to each other and the half housing includes a main plate, bent extensions on a top of the main plate, and a slit through the main plate and under the extension;
   the chain mounting assembly is disposed between the main plates and includes two parallel frames, two elongated limit members each disposed in the frame and having an elongated slot, and a shuttle member fastened between slots of the limit members and having a pawl member on a bottom;
   the roller chain assembly is disposed between one set of the frame and the limit member and the other set of the frame and the limit member, the roller chain assembly includes two sets of a plurality of plate members, each plate member having a tooth on a top for receipt of the pawl member, and a hook extending downward from a bottom; and a plurality of rollers each driven through the plate member of one set and the plate member of the other set;
   the link is bifurcated and has one ends secured to sides of the shuttle member through the slits; and
   the drive mechanism is configured to rotate the other end of the link.

2. The crane cargo lane device of claim 1, wherein the plate members of one set of the roller chain assembly and the plate members of the other set of the roller chain assembly are alternate, and the plate members of either set of the roller chain assembly form a closed loop.

3. The crane cargo lane device of claim 1, further comprising two mounting members with the shuttle member disposed therebetween, wherein the rear one of the mounting members has a pawl element on a bottom.

4. A crane cargo lane device, comprising two half housings, a sprocket assembly, a spacer assembly, a roller assembly, a roller chain assembly, and a drive mechanism wherein:
   the half housings are parallel to each other and the half housing includes a main plate, bent extensions on a top of the main plate, a front slit through the main plate, and a grooved member on a bottom;
   the sprocket assembly is disposed at rear portions of the half housings and includes spaced sprockets and an axle driven through the sprockets and the main plates;
   the spacer assembly is disposed between the main plates and includes a plurality of spaced, cylindrical members secured to the main plates, and a trough member disposed on the cylindrical members;
   the roller assembly includes a plurality of rollers rotatably mounted between the main plates and being forward of the spacer assembly, and positioning members on an outer surface of each main plate and secured to ends of the rollers respectively;
   the roller chain assembly is disposed between the main plate and meshes with the sprockets at a rear end thereof; the rollers rotatably contact a forward end of the roller chain assembly; the sprockets, the spacer assembly, and the rollers are disposed in the roller chain assembly; a lower portion of the roller chain assembly rotatably contacts the grooved members; the roller chain assembly includes two sets of a plurality of plate members each having spaced roller members rotatably secured to the corresponding plate member of the other set, and a hook extending downward from a bottom under one of the roller members; and the roller members rotatably contact the grooved members; and
   the drive mechanism is configured to impart a rotational force to the axle via a conveyor belt.

5. The crane cargo lane device of claim 4, further comprising a joining member for securing top, front portions of the main plates together.

6. The crane cargo lane device of claim 4, wherein the sprocket assembly further comprises fasteners for fastening the axle, the sprockets, and the main plates together.

7. The crane cargo lane device of claim 4, wherein the roller assembly further comprises a control member disposed in the slits and attached to the rollers for adjusting locations of the rollers.

8. The crane cargo lane device of claim 4, wherein the roller assembly further comprises limit members each disposed on the outer surface of the main plate and extending forward, downward from a lower one of the positioning members.

9. The crane cargo lane device of claim 4, wherein the plate members of one set of the roller chain assembly and the plate members of the other set of the roller chain assembly are alternate, and the plate members of either set of the roller chain assembly form a closed loop.

* * * * *